(12) United States Patent
Lee et al.

(10) Patent No.: US 11,449,259 B2
(45) Date of Patent: Sep. 20, 2022

(54) MEMORY CONTROLLER AND OPERATING METHOD THEREOF

(71) Applicant: SK hynix Inc., Icheon-si (KR)

(72) Inventors: Ji Hoon Lee, Icheon-si (KR); Woo Young Yang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/204,317

(22) Filed: Mar. 17, 2021

(65) Prior Publication Data

US 2022/0100405 A1    Mar. 31, 2022

(30) Foreign Application Priority Data

Sep. 25, 2020    (KR) .......................... 10-2020-0125031

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/0652* (2013.01); *G06F 3/0659* (2013.01); *G06F 3/0673* (2013.01)

(58) Field of Classification Search
CPC .... G06F 3/0647; G06F 3/0604; G06F 3/0656; G06F 3/0659
See application file for complete search history.

(56) References Cited

U.S. PATENT DOCUMENTS

| 7,401,193 | B1 | 7/2008 | Ye |
| 8,316,176 | B1 | 11/2012 | Phan |
| 8,843,712 | B1 | 9/2014 | Smith |
| 2009/0113121 | A1 | 4/2009 | Lee |
| 2017/0123972 | A1* | 5/2017 | Gopinath .............. G06F 3/0616 |
| 2019/0171559 | A1 | 6/2019 | Lee |
| 2021/0141532 | A1* | 5/2021 | Byun .................... G06F 3/0611 |
| 2021/0271757 | A1* | 9/2021 | Horspool ................ H04L 67/30 |

FOREIGN PATENT DOCUMENTS

| KR | 10-2053865 B1 | 9/2014 |
| KR | 10-2017-0140467 A | 12/2017 |
| KR | 10-2018-0119470 A | 11/2018 |
| KR | 10-2020-0014175 A | 2/2020 |

OTHER PUBLICATIONS

Non-Final Office Action of U.S. Appl. No. 17/183,899 from the USPTO dated Mar. 21, 2022.

* cited by examiner

*Primary Examiner* — Baboucarr Faal

(57) ABSTRACT

There are provided a memory controller and an operating method thereof. The memory controller includes: a meta data storage for storing meta data including mapping information of data stored in a memory device and valid data information representing whether the data stored in the memory device is valid data; and a migration controller for controlling the memory device to perform a migration operation of moving, to a target memory block, valid data stored in a plurality of source memory blocks included in the memory device, based on the meta data. The migration controller controls the memory device to read a second valid data stored in the second die before reading a first valid data stored in the first die, based on a comparison result between a reference time and a delay time required until before the first valid data is read.

20 Claims, 14 Drawing Sheets

FIG. 6

META DATA

| LOGICAL ADDRESS | PHYSICAL ADDRESS | VALIDITY |
|---|---|---|
| LBA1 | PBA1 | Valid |
| LBA2 | PBA2 | Invalid |
| LBA3 | PBA3 | Invalid |
| LBA4 | PBA4 | Valid |

OPERATION INFORMATION

| DIE | OPERATION KIND | BEING PERFORMED | PREVIOUS OPERATION START TIME |
|---|---|---|---|
| DIE0 | PROGRAM OPERATION | O | T1 |
| DIE1 | PROGRAM OPERATION | X | - |
| DIE2 | ERASE OPERATION | O | T2 |
| DIE3 | ERASE OPERATION | X | - |

| CMD | DIE |
|---|---|
| MGR_CMD1 | DIE0 |
| MGR_CMD2 | DIE1 |
| MGR_CMD3 | DIE2 |
| MGR_CMD4 | DIE3 |
| MGR_CMD1 | DIE0 |
| MGR_CMD2 | DIE1 |
| MGR_CMD3 | DIE2 |
| ⋮ | ⋮ |

| CMD | DIE |
|---|---|
| MGR_CMD2 | DIE1 |
| MGR_CMD4 | DIE3 |
| MGR_CMD1 | DIE0 |
| MGR_CMD3 | DIE2 |
| ⋮ | ⋮ |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2020-0125031, filed on Sep. 25, 2020, in the Korean Intellectual Property Office, the entire disclosure of which is incorporated herein by reference.

BACKGROUND

1. Technical Field

The present disclosure generally relates to an electronic device, and more particularly, to a memory controller and an operating method thereof.

2. Related Art

A storage device is a device that stores data under the control of a host. The storage device may include a memory device that stores data and a memory controller that controls the memory device. The memory device may be classified into volatile memory devices and nonvolatile memory devices.

A volatile memory device may store data while being supplied with power from a power supply. When the supply of power is interrupted, data stored in the volatile memory device may disappear. The volatile memory device may include, for example, a Static Random Access Memory (SRAM), a Dynamic Random Access Memory (DRAM), and the like.

A nonvolatile memory device may be a memory device in which data does not disappear even when the supply of power is interrupted. The nonvolatile memory device may include, for example, a Read Only Memory (ROM), a Programmable ROM (PROM), an Electrically Programmable ROM (EPROM), an Electrically Erasable ROM (EEROM), a flash memory, and the like.

SUMMARY

Embodiments provide a memory controller for improving performance by increasing a speed at which valid data is read in a background operation, and a method of operating the memory controller.

In accordance with an aspect of the present disclosure, there is provided a memory controller for controlling a memory device including a first die and a second die, each die having a plurality of source memory blocks, the memory controller including: a meta data storage configured to store meta data including mapping information of data stored in the plurality of source memory blocks of the first die and the second die and valid data information indicating whether the stored data is valid data; and a migration controller configured to control the memory device to perform a migration operation of moving valid data of the first die and the second die, from a plurality of source memory blocks to a plurality of target memory blocks in the memory device, based on the meta data, wherein the migration operation of moving the valid data includes reading the valid data from the first die and the second die, and wherein the migration controller controls the memory device to read a second valid data stored in the second die before reading a first valid data stored in the first die, based on a comparison result between a reference time and a delay time spanning between the time of scheduling a read command for the first valid data and the time of reading the first valid data in the migration operation.

In accordance with another aspect of the present disclosure, there is provided a method for operating a memory controller for controlling a memory device including a first die and a second die, each of the first die and the second die having a plurality of source memory blocks, the method including: selecting a plurality of source memory blocks from among a plurality of memory blocks included in the memory device based on meta data including mapping information of data stored in the memory device and valid data information indicating whether the data stored in the memory device is valid data; estimating a delay time until a first valid data stored in the first die is read; outputting, to the memory device, a second migration read command for commanding the memory device to read a second valid data stored in the second die before outputting a first migration read command for commanding the memory device to read the first valid data, based on a comparison result between the delay time and a reference time; and outputting, to the memory device, a migration write command for commanding the memory device to store the second valid data in a target memory block in response to that a migration read operation corresponding to the second migration read command is completed.

In accordance with another aspect of the present disclosure, there is provided a method for operating a storage device to schedule data migration operations for a plurality of dies in a memory device, the method comprising: providing, for the storage device, a memory controller having a command controller, a command storage, an operation information storage, and a migration command queue; providing, for the storage device, a memory device having a plurality of dies, each of the plurality of dies including a data stored in a plurality of source memory blocks; storing a plurality of migration commands corresponding to selected source memory blocks from among the plurality of dies in the command storage; storing, for each of the plurality of dies, an operation information including an operation kind of a previous operation performed on the die before the migration command is scheduled, an information as to whether the previous operation is being performed, and a previous operation start time, in the operation information storage; estimating, for each of the plurality of migration commands in the command storage, a delay time from a time at which each of the plurality of migration commands is scheduled to a time at which a read operation for the respective migration command begins; and writing each of the plurality of migration commands into the migration command queue in order from the smallest delay time to the largest delay time, wherein estimating the delay time includes calculating a required time for the previous operation based on the previous operation start time and the operation kind of the previous operation, and includes calculating the difference between the required time and a time at which the migration command is scheduled to result in the delay time, and wherein the read operation for a respective migration command is assumed to start when the previous operation is completed.

BRIEF DESCRIPTION OF THE DRAWINGS

Example embodiments will now be described more fully hereinafter with reference to the accompanying drawings; however, concepts disclosed herein may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating meta data stored in a meta data storage in accordance with an embodiment of the present disclosure.

FIG. 10 is a diagram illustrating a command storage shown in FIG. 8.

FIG. 11 is a diagram illustrating a migration command queue shown in FIG. 8.

DETAILED DESCRIPTION

The specific structural or functional descriptions disclosed herein are merely illustrative for the purpose of describing embodiments according to the concepts of the present disclosure. The embodiments according to the concepts of the present disclosure can be implemented in various forms, and cannot be construed as limited to the embodiments set forth herein.

Figure 1:
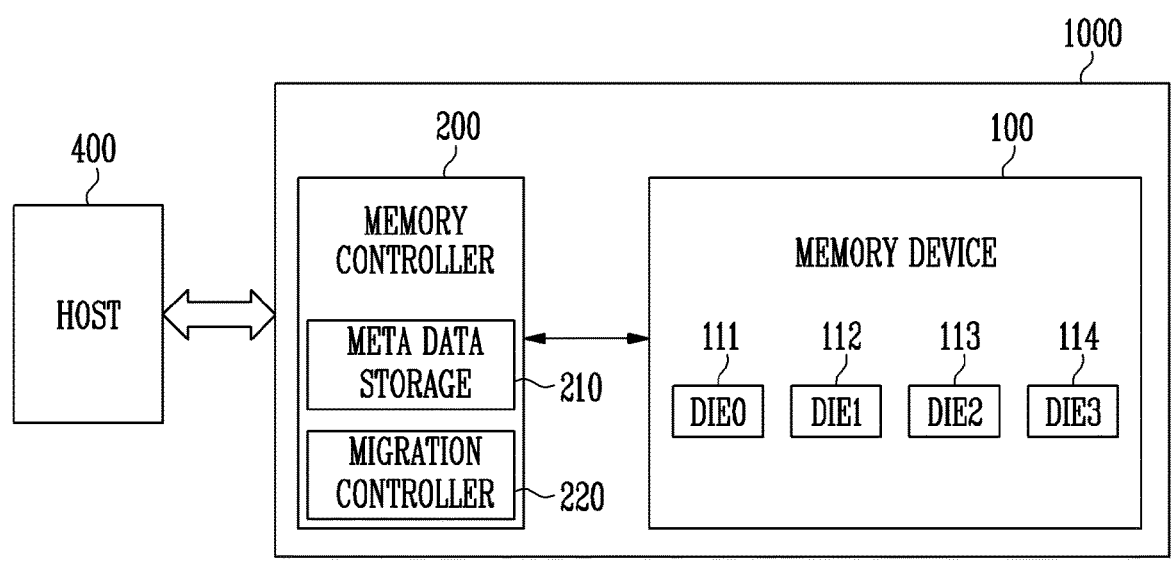
FIG. 1 is a diagram illustrating a storage system in accordance with embodiments of the present disclosure.

FIG. 1 is a diagram illustrating a storage system in accordance with embodiments of the present disclosure.

Referring to FIG. 1, a storage system may be implemented as a data processing system, such as for example, a personal computer (PC) or a data center, as an enterprise type data storage system, as a data processing system including a direct attached storage (DAS), as a data processing system including a storage area network (SAN), or as a data processing system including a network attached storage, or the like.

The storage system may include a storage device 1000 and a host 400.

The storage device 1000 may be a device for storing data according to a request of the host 400, such as a mobile phone, a smart phone, an MP3 player, a laptop computer, a desktop computer, a game console, a TV, a tablet PC or an in-vehicle infotainment system.

The storage device 1000 may be manufactured as any one of various types of storage devices according to a host interface that is a communication scheme with the host 400. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be manufactured as any one of various kinds of package types. For example, the storage device 1000 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The storage device 1000 may include a memory device 100 and a memory controller 200.

The memory device 100 may operate under the control of the memory controller 200. Specifically, the memory device 100 may receive a command and an address from the memory controller 200, and access a memory cell selected by the address among memory cells (not shown). The memory device 100 may perform an operation indicated by the command on the memory cell selected by the address.

The command may be, for example, a program command, a read command, or an erase command, and the operation indicated by the command may be, for example, a program operation (or write operation), a read operation, or an erase operation.

The program operation may be an operation in which the memory device 100 stores write data provided from the host 400 under the control of the memory controller 200.

For example, the memory device 100 may receive a program command, an address, and data, and may program the data in a memory cell selected by the address. The data to be programmed in the selected memory cell may be defined as write data.

The read operation may be an operation in which the memory device 100 reads read data stored in the memory device 100 under the control of the memory controller 200.

For example, the memory device 100 may receive a read command and an address, and read data from an area selected by the address in a memory cell array (not shown). The data to be read from the selected area, from among data stored in the memory device 100, may be defined as read data.

The erase operation may be an operation in which the memory device 100 erases data stored in the memory device 100 under the control of the memory controller 200.

For example, the memory device 100 may receive an erase command and an address, and may erase data stored in an area selected by the address.

The memory device 100 may be implemented as a volatile memory device or a nonvolatile memory device.

For example, the volatile memory device may include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and the like.

For example, the nonvolatile memory device may include a flash memory. The flash memory may include a NAND flash memory, a vertical NAND flash memory, a NOR flash memory, and the like.

In this specification, for convenience of description, it is assumed that the memory device 100 is a NAND flash memory.

The memory device 100 may store write data under the control of the memory controller 200, or may read stored read data and provide the read data to the memory controller 200.

The memory device 100 may include a plurality of dies 111 (DIE0), 112 (DIE1), 113 (DIE2), and 114 (DIE3). A number of the plurality of dies 111, 112, 113, and 114 may be four as shown in FIG. 1. However, this is for the purpose of describing an embodiment of the present disclosure, and the number of dies contemplated by present disclosure is not limited thereto. Hereinafter, it is assumed that the number of the plurality of dies 111, 112, 113, and 114 is four for illustration purposes.

One die from among the plurality of dies 111 to 114 may include at least one plane. One plane may include a memory cell array (not shown) including memory cells for storing write data.

The memory cell array may include a plurality of memory blocks (not shown). A memory block may be a unit for performing an erase operation for erasing data.

A memory block may include a plurality of pages (not shown). A page may be a unit for performing a program operation of storing write data or a read operation of reading stored read data.

The memory controller 200 may control overall operations of the storage device 1000.

When power is applied to the storage device 1000, the memory controller 200 may execute firmware. When the memory device 100 is a flash memory device, the firmware may include a host interface layer, a flash translation layer, and a flash interface layer.

The host interface layer may control an operation between the host 400 and the memory controller 200.

The flash translation layer may translate a logical address provided from the host 400 into a physical address. To this end, the memory controller 200 may store map data as a mapping relationship between the logical address and the physical address.

The flash interface layer may control communication between the memory controller 200 and the memory device 100.

The memory controller 200 may control the memory device 100 to perform a program operation, a read operation, and an erase operation respectively in response to a write request, a read request, and an erase request of the host 400.

In the program operation, the memory controller 200 may provide the memory device 100 with a program command, a physical address, and write data.

In the read operation, the memory controller 200 may provide the memory device 100 with a read command and a physical address.

In the erase operation, the memory controller 200 may provide the memory device 100 with an erase command and a physical address.

The memory controller 200 may autonomously generate a command, an address, and data regardless of, or independent of, any request provided from the host 400. The memory controller 200 may transmit the command, the address, and the data, which are autonomously generated, to the memory device 100.

For example, the memory controller 200 may generate a command for performing a background operation, an address, and data. Also, the memory controller 200 may provide the memory device 100 with the command, the address, and the data.

The background operation may be at least one of wear leveling, read reclaim, and garbage collection.

The wear leveling may mean, for example, static wear leveling, dynamic wear leveling, etc. The static wear leveling may mean an operation of storing the number of times memory blocks are erased, and moving cold data, which hardly or rarely is involved in an erase operation or a write operation, to a memory block which is erased a largest or the greatest number of times. The dynamic wear leveling may mean an operation of storing the number of times memory blocks are erased, and programing data in a memory block which is erased a smallest or the fewest number of times.

The read reclaim may mean an operation of moving data stored in a memory block to another memory block before an uncorrectable error occurs in the data stored in the memory block.

The garbage collection may mean an operation of copying valid data included in a bad block from among memory blocks to a free block, and erasing invalid data included in the bad block. The valid data included in the bad block is copied to the free block, which may mean that the valid data included in the bad block is moved to the free block.

As described above, an operation of moving valid data stored in a specific memory block to another memory block in a background operation may be defined as a migration operation.

When it is determined that it is necessary to perform a background operation, the memory controller 200 may perform the migration operation.

For example, the memory controller 200 may control the memory device 100 to perform a migration operation within a period starting from after the memory controller 200 provides the host 400 with a response to a request (e.g., a write request, a read request, an erase request, or the like) provided from the host 400 until the memory controller 200 receives a subsequent request, which is provided by the host 400.

The memory controller 200 may include a meta data storage 210 and a migration controller 220.

The meta data storage 210 may store meta data about data stored in a plurality of memory blocks. The meta data may include, for example, mapping information and valid data information of the data stored in the plurality of memory blocks.

The mapping information may be information representing a mapping relationship between a logical address provided from the host 400 and a physical address of a memory block.

The valid data information may be information representing whether the data stored in the plurality of memory blocks is valid data.

The meta data storage 210 may be implemented as, for example, a volatile memory device.

The migration controller 220 may control the memory device 100 to perform a migration operation of moving valid data stored in a plurality of source memory blocks to a target memory block, based on the meta data.

In an embodiment, the migration controller 220 may select a plurality of source memory blocks based on the meta data. For example, the migration controller 220 may select, based on the mapping information and the valid data information, source memory blocks from among a plurality of memory blocks included in each of the plurality of dies 111 to 114.

A source memory block may be a memory block for storing valid data having a size smaller than or equal to a predetermined reference size from among the plurality of memory blocks.

In an embodiment, a source memory block may be a memory block in which cold data is stored in a static wear leveling operation. Alternatively, the source memory block may be a memory block which is erased a largest number of times in a dynamic wear leveling operation. Alternatively, the source memory block may be a memory block in which data is stored before the data is moved in a read reclaim operation. Alternatively, the source memory block may be a victim block (or bad block) selected in garbage collection.

The migration controller 220 may check valid data stored in the plurality of source memory blocks, based on the valid data information.

In an embodiment, the target memory block may be a memory block which is erased a largest number of times in the static wear leveling operation. Alternatively, the target memory block may be a memory block which is erased a smallest number of times in the dynamic wear leveling operation. Alternatively, the target memory block may be another memory block to which data stored in a memory block is to be moved in the read reclaim operation. Alternatively, the target memory block may be a free block selected in the garbage collection.

The migration controller 220 may provide the memory device 100 with a migration read command for commanding the memory device 100 to read valid data stored in a plurality of source memory blocks. The memory device 100 may perform a migration read operation of reading the valid data stored in the plurality of source memory blocks in response to the migration read command. When the migration read operation is completed, the migration controller 220 may acquire the valid data that is read by the memory device 100.

For example, the migration controller 220 may sequentially provide a first migration read command and a second migration read command to the memory device 100. The memory device 100 may read valid data stored in source memory blocks included in a first die 111, and read valid data stored in source memory blocks included in a second die 112.

The first migration read command may be a command for commanding the memory device 100 to read the valid data stored in the source memory blocks included in the first die 111. The second migration read command may be a command for commanding the memory device 100 to read the valid data stored in the source memory blocks included in the second die 112.

In an embodiment, the memory device may perform a program operation, an erase operation, or the like before the migration read operation is started. For example, a program operation may be in process before the first migration read command is scheduled in the memory controller 200. However, the present disclosure is not limited thereto.

Although the memory device 100 receives the migration read command before a program operation, an erase operation, or the like is completed, the migration read operation may be performed after the program operation, the erase operation, or the like is completed. For example, the memory device 100 may delay a migration read operation from a time at which the first migration read command is to be scheduled to a time at which the program operation performed in the first die 111 is completed. Thus, the migration read operation may be scheduled before the memory device 100 performs the migration read operation, which take place after the program operation performed in the first die 111 is completed.

The time required to perform the migration read operation increases due to the delay in starting the migration read operation. The delay begins from a time at which the migration read command is provided to the memory device 100 until a time at which the program operation, the erase operation, or the like is completed, after which the migration read operation may start. Accordingly, the time required to perform the next operation (e.g., a program operation) for a request (e.g., a write request) subsequently provided from the host 400 may also be delayed due to the increases in delay of the migration read operation, and hence the overall performance of the storage device 1000 may be decreased.

To this end, a migration controller 220 in accordance with an embodiment of the present disclosure may compare a reference time with a delay time that is required up until a migration operation begins, such as for example up until first valid data stored in the source memory blocks included in the first die 111, from among the plurality of source memory blocks, is read. Based on a result obtained by comparing the delay time and the reference time for first and second migration operations, for example, the migration controller 220 may control the memory device 100 to read, earlier than the first valid data, second valid data stored in the source memory blocks included in the second die 112 from among the plurality of source memory blocks.

In an embodiment, when a memory device 100 is controlled to read a second valid data earlier than a first valid data, the migration controller 220 may compare the reference time with a delay time required up until before the second valid data stored in the source memory blocks included in the second die 112, from among the plurality of source memory blocks, is read. Similarly, the migration controller 220 may control the memory device 100 to read, earlier than the second valid data, a third valid data stored in source memory blocks included in a third die 113, from among the plurality of source memory blocks, based on a result obtained by comparing the delay time and the reference time.

In an embodiment, when a memory device 100 is controlled to read a third valid data earlier than a second valid data, the migration controller 220 may compare the reference time with a delay time required up until before the third valid data stored in the source memory blocks included in the third die 113, from among of source memory blocks, is read. Similarly, the migration controller 220 may control the memory device 100 to read, earlier than reading the third valid data, a fourth valid data stored in source memory blocks included in a fourth die 114, from among the plurality of source memory blocks, based on a result obtained by comparing the delay time and the reference time.

The first to fourth valid data are used to distinguish valid data stored in the source memory blocks included in the respective first to fourth dies 111 to 114, and are not limited by the terms "first to fourth."

The migration controller 220 may provide the memory device 100 with a migration write command for commanding the memory device 100 to store valid data that is read to a target memory block. The memory device 100 may perform a migration write operation of storing the valid data in the target memory block in response to the migration write command.

The memory controller 200 may provide the host 400 with a response to a request provided by the host 400, and stand by until the memory controller 200 receives a subsequent request that the host 400 provides after the response is provided from the memory controller 200. The migration controller 220 may control the memory device 100 to perform a migration operation within a period from after the response is provided to the host 400 to when a subsequent request is received from the host 400.

The memory controller 200 may control two or more memory devices 100. For example, the memory controller 200 may control the memory devices 100 according to an interleaving technique so as to improve operational performance.

The interleaving technique may be a technique for controlling operations on the two or more memory devices 100 to overlap with each other.

Although not shown in FIG. 1, the storage device 1000 may further include a buffer memory. For example, the buffer memory may be implemented as any one of a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), and a Spin Transfer Torque Random Access Memory (SU-RAM).

The host 400 may communicate with the storage device 1000 through an interface (not shown).

The interface may be implemented as a serial advanced technology attachment (SATA) interface, a SATA express (SATAe) interface, a serial attached small computer system interface (SAS) interface, a peripheral component interconnect express (PCIe) interface, a non-volatile memory express (NVMe) interface, an advanced host controller interface (AHCI) interface, or a multimedia card interface, as non-limiting examples.

The host 400 may store write data in the storage device 1000, or communicate with the storage device 1000 to acquire read data stored in the storage device 1000.

In an embodiment, the host 400 may provide the storage device 1000 with a write request for requesting the storage device 1000 to store write data. Also, the host 400 may provide the storage device 1000 with a write request, write data, and a logical address for identifying the write data.

The storage device 1000 may store the write data provided by the host 400 in the memory device 100 and provide the host 400 with a response that the storing of the write data has been completed, in response to the write request provided from the host 400.

In an embodiment, the host 400 may provide the storage device 1000 with a read request for requesting the storage device 1000 to provide data stored in the storage device 1000 to the host 400. Also, the host 400 may provide a read request and a read address to the storage device 1000.

The storage device 1000 may read, from the memory device 100, read data corresponding to the read address provided by the host 400 and provide the host 400 with the read data as a response to the read request from the host 400.

Figure 2:
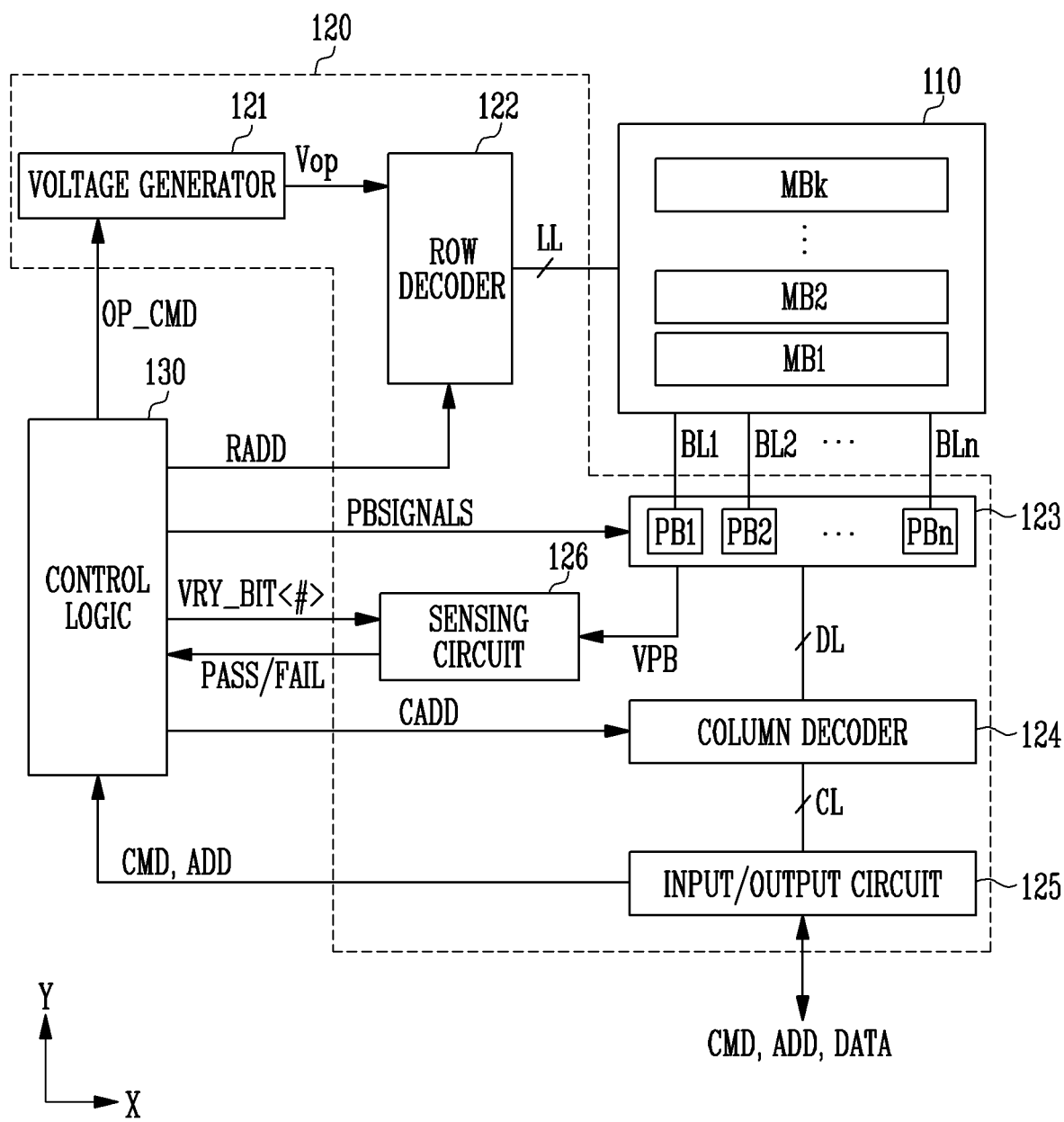
FIG. 2 is a diagram illustrating a memory device in accordance with an embodiment of the present disclosure.

FIG. 2 is a diagram illustrating a memory device in accordance with an embodiment of the present disclosure.

Referring to FIGS. 1 and 2, a memory device 100 may include a memory cell array 110, a peripheral circuit 120, and a control logic 130.

The memory cell array 110 may include a plurality of memory blocks MB1 to MBk (where k is a positive integer). The number of the plurality of memory blocks MB1 to MBk is merely an example for describing embodiments of the present disclosure, and the present disclosure is not limited thereto.

Each of the memory blocks MB1 to MBk may be connected to local lines LL and bit lines BL1 to BLn (where n is a positive integer).

The local lines LL may be connected to a row decoder 122.

The local lines LL may be connected to each of the memory blocks MB1 to MBk.

Although not shown in FIG. 2, the local lines LL may include a first select line, a second select line, and a plurality of word lines arranged between the first select line and the second select line.

Although not shown in the drawing, the local lines LL may further include dummy lines arranged between the first select line and the word lines, dummy lines arranged between the second select line and the word lines, and pipe lines.

The bit lines BL1 to BLn may be commonly connected to the memory blocks MB1 to MBk.

The memory blocks MB1 to MBk may be implemented in a two-dimensional or three-dimensional structure.

For example, memory cells in the memory blocks MB1 to MBk having a two-dimensional structure may be arranged in a direction parallel to a substrate. This will be described later with reference to FIG. 4.

For example, memory cells in the memory blocks MB1 to MBk having a three-dimensional structure may be stacked in a direction vertical to a substrate layer.

The peripheral circuit 120 may include a voltage generator 121, the row decoder 122, a page buffer group 123, a column decoder 124, an input/output circuit 125, and a sensing circuit 126.

The voltage generator 121 may generate various operating voltages Vop used for a program operation, a read operation, and an erase operation in response to an operation command OP_CMD. Also, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under the control of the control logic 130.

In an embodiment, the voltage generator 121 may generate an internal power voltage by regulating external power voltage. The internal power voltage generated by the voltage generator 121 may be used as an operating voltage of the memory device 100.

In an embodiment, the voltage generator 121 may generate a plurality of voltages by using the external power voltage or the internal power voltage. For example, the voltage generator 121 may include a plurality of pumping capacitors for receiving the internal power voltage, and generate a plurality of voltages by selectively activating the plurality of pumping capacitors under the control of the control logic 130. The plurality of generated voltages may be supplied to the memory cell array 110 by the row decoder 122.

The row decoder 122 may transfer the operating voltages Vop to the local lines LL in response to a row address RADD. The operating voltages Vop may be transferred to a selected memory block among the memory blocks MB1 to MBk through the local lines LL.

For example, in a program operation, the row decoder 122 may apply a program voltage to a selected word line, and apply a program pass voltage having a level lower than that of the program voltage to unselected word lines. In a program verify operation, the row decoder 122 may apply a verify voltage to the selected word line, and apply a verify pass voltage higher than the verify voltage to the unselected word lines.

In a read operation, the row decoder 122 may apply a read voltage to the selected word line, and apply a read pass voltage higher than the read voltage to the unselected word lines.

In an erase operation, the row decoder 122 may select one memory block according to a decoded address. In the erase operation, the row decoder 122 may apply a ground voltage to word lines connected to the selected memory block.

The page buffer group 123 may include first to nth page buffers PB1 to PBn. The first to nth page buffers PB1 to PBn may be connected to the memory cell array 110 respectively through first to nth bit lines BL1 to BLn. The first to nth page buffers PB1 to PBn may operate under the control of the control logic 130.

Specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read operation or a verify operation.

In a program operation, when the program voltage is applied to the selected word line, the first to nth page buffers PB1 to PBn may transfer data DATA received through the column decoder 124 and the input/output circuit 125 to selected memory cells through the first to nth bit lines BL1 to BLn. Memory cells of a selected page are programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a verify operation, the first to nth page buffers PB1 to PBn may sense data stored in selected memory cells, from the selected memory cells through the first to nth bit lines BL1 to BLn.

In a read operation, the first to nth page buffers PB1 to PBn may sense data DATA from memory cells of a selected page through the first to nth bit lines BL1 to BLn, and output the sensed data DATA to the input/output circuit 125 under the control of the column decoder 124.

In an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL, or exchange data with the input/output circuit 125 through column lines CL.

The input/output circuit 125 may transfer a command CMD and an address ADD, which are transferred from the memory controller 200, to the control logic 130, or exchange data DATA to the column decoder 124.

In a read operation or a verify operation, the sensing circuit 126 may generate a reference current in response to an allow bit VRY_BIT<#>, and output a pass signal PASS or a fail signal FAIL by comparing a sensing voltage VPB received from the page buffer group 123 with a reference voltage generated by the reference current.

The control logic 130 may control the peripheral circuit 120 by outputting the operation command OP_CMD, the row address RADD, the page buffer control signal PBSIGNALS, and the allow bit VRY_BIT<#> in response to the command CMD and the address ADD.

Figure 3:
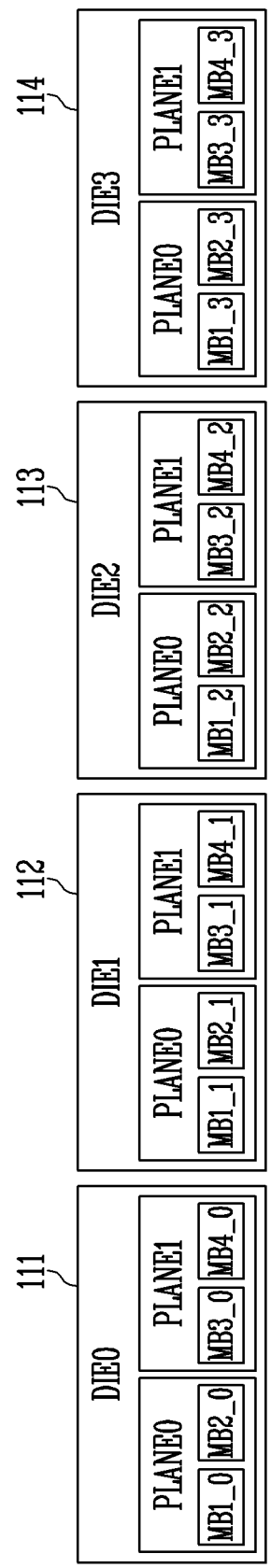
FIG. 3 is a diagram illustrating an embodiment of a plurality of dies.

FIG. 3 is a diagram illustrating an embodiment of a plurality of dies.

Referring to FIG. 3, each of the plurality of dies 111 to 114 may include a plurality of planes PLANE0 and PLANE1. For example, a first die 111 may include a first plane PLANE0 and a second plane PLANE1. A number of the plurality of planes PLANE0 and PLANE1 in each of the plurality of dies may be two as shown in FIG. 3. However, this is merely an example for describing an embodiment of the present disclosure, and other embodiments of the present disclosure are not limited thereto. Hereinafter, it is assumed that the number of the plurality of planes PLANE0 and PLANE1 is two.

A plane may include a plurality of memory blocks. For example, the first plane PLANE0 included in the first die 111 may include a plurality of memory blocks MB1_0 and MB2_0, and the second plane PLANE1 included in the first die 111 may include a plurality of memory blocks MB3_0 and MB4_0.

Figure 4:
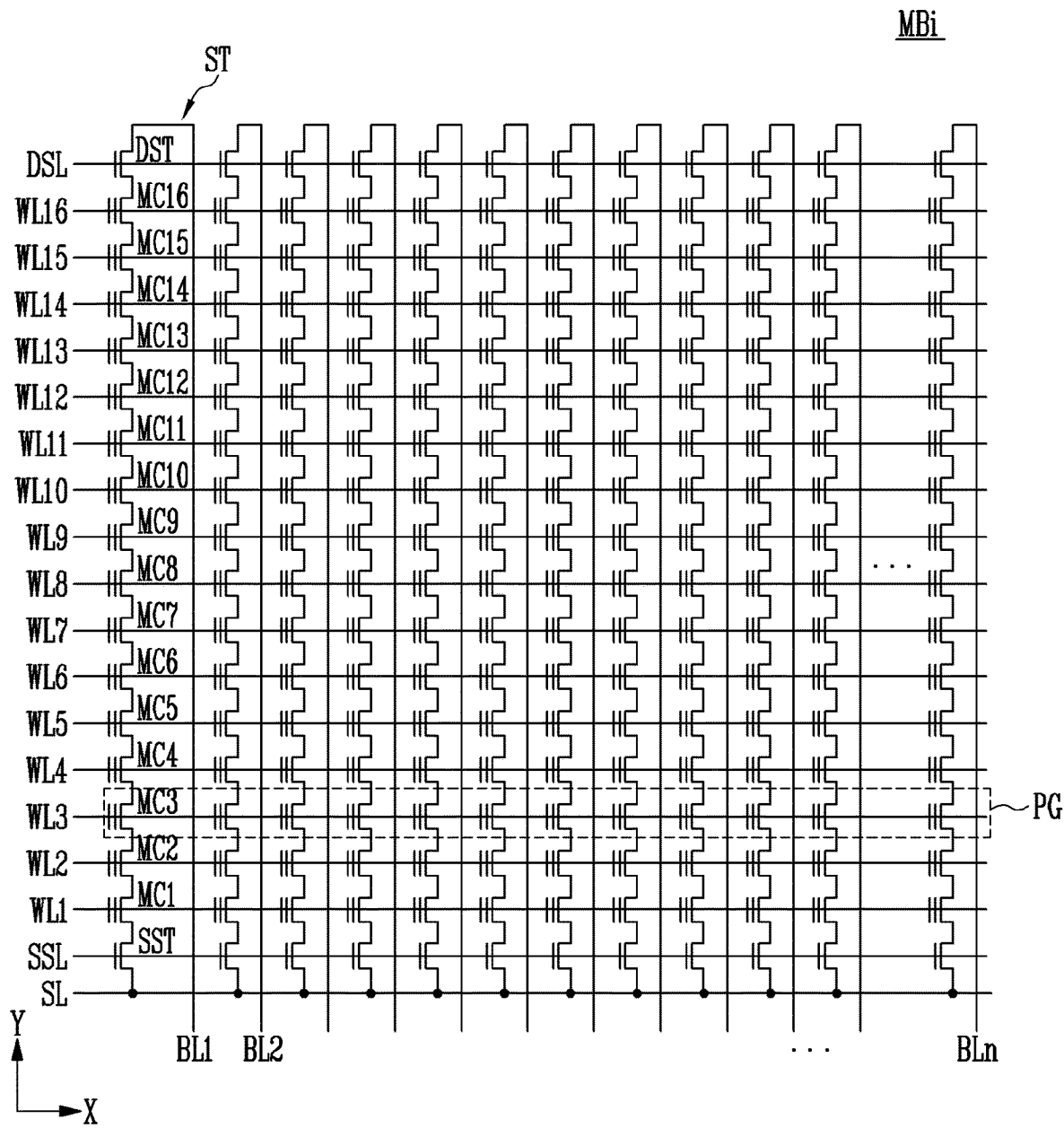
FIG. 4 is a diagram illustrating an embodiment of a memory block having a two-dimensional structure.

FIG. 4 is a diagram illustrating an embodiment of a memory block having a two-dimensional structure.

Referring to FIG. 4, a memory block MBi shown in FIG. 4 may be any one of the memory blocks MB1 to MBk shown in FIG. 2.

The memory block MBi may include a first select line, a second select line, a plurality of word lines WL1 to WL16, a source line SL, a plurality of bit lines BL1 to BLn, and a plurality of strings ST.

The first select line may be, for example, a source select line SSL. Hereinafter, it is assumed that the first select line is the source select line SSL.

The second select line may be, for example, a drain select line DSL. Hereinafter, it is assumed that the second select line is the drain select line DSL.

The plurality of word lines WL1 to WL16 may be arranged in parallel to each other between the source select line SSL and the drain select line DSL.

A number of the plurality of word lines WL1 to WL16 shown in FIG. 4 is merely illustrative, and the number of word lines in a string ST is not limited to the number illustrated in the drawings.

The source line SL may be commonly connected to the plurality of strings ST.

The plurality of bit lines BL1 to BLn may be respectively connected to the strings ST.

The plurality of strings ST may be connected to the bit lines BL1 to BLn respectively and may be connected to the source line SL.

A string ST connected to a first bit line BL1 in FIG. 4 will be described in detail as an example, however, it will be understood that the strings ST may be configured identically to one another.

The string ST may include a plurality of memory cells MC1 to MC16, at least one first select transistor, and at least one second select transistor.

The plurality of memory cells MC1 to MC16 may be connected in series to each other between a source select transistor SST and a drain select transistor DST.

Gates of the memory cells MC1 to MC16 may be respectively connected to the plurality of word lines WL1 to WL16. Therefore, a number of the plurality of memory cells MC1 to MC16 included in one string ST may be equal to that of the plurality of word lines WL1 to WL16.

Any one memory cell from among the plurality of memory cells MC1 to MC16 may be configured as, for example, any one of a single-level cell (SLC), a multi-level cell (MLC), a triple-level cell (TLC), and a quad-level cell (QLC).

A group of memory cells connected to the same word line among memory cells included in different strings ST may be referred to as a physical page PG. Therefore, the memory block MBi may include physical pages PG, which number in correspondence to a number of the word lines WL1 to WL16. Hereinafter, it is assumed that the memory cells (e.g., MC3) included in the physical page PG are selected memory cells.

The first select transistor may be, for example, the source select transistor SST. Hereinafter, it is assumed that the first select transistor is the source select transistor SST.

A first electrode of the source select transistor SST may be connected to the source line SL. A second electrode of the source select transistor SST may be connected to a first memory cell MC1 from among the plurality of memory cells MC1 to MC16. A gate electrode of the source select transistor SST may be connected to the source select line SSL.

The second select transistor may be, for example, the drain select transistor DST. Hereinafter, it is assumed that the second select transistor is the drain select transistor DST.

A first electrode of the drain select transistor DST may be connected to a sixteenth memory cell MC16 from among the plurality of memory cells MC1 to MC16. A second electrode of the drain select transistor DST may be connected to the first bit line BL1. A gate electrode of the drain select transistor DST may be connected to the drain select line DSL.

Figure 5:
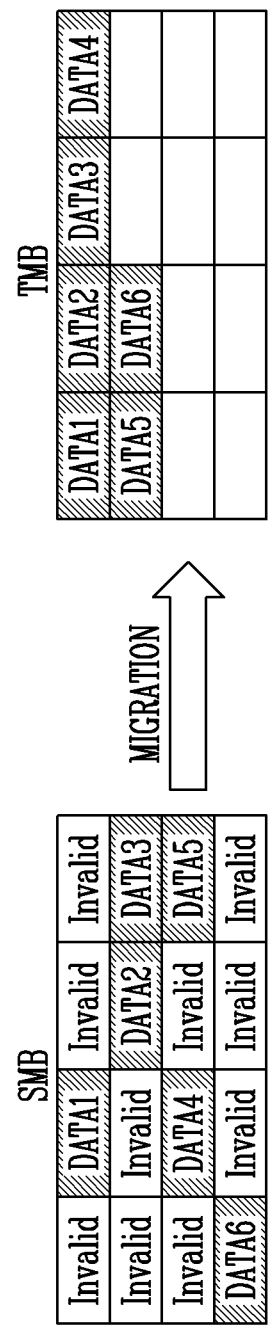
FIG. 5 is a diagram illustrating a migration operation in accordance with an embodiment of the present disclosure.

FIG. 5 is a diagram illustrating a migration operation in accordance with an embodiment of the present disclosure. FIG. 6 is a diagram illustrating meta data stored in a meta data storage in accordance with an embodiment of the present disclosure.

Referring to FIG. 5, an erase operation is performed in units of memory blocks, so a migration operation of storing valid data DATA1 to DATA6 stored in a source memory block SMB to a target memory block TMB may be performed so as to erase invalid data Invalid stored in the source memory block SMB.

The migration operation may include a migration read operation and a migration write operation.

Specifically, a memory controller 200 may select a source memory block SMB from among a plurality of memory blocks, based on meta data. The source memory block SMB may be a memory block for storing valid data having a size smaller than or equal to a predetermined reference size.

In an embodiment, the source memory block SMB may be a victim block selected in garbage collection.

An example will be described in detail with reference to FIG. 5. Valid data DATA1 to DATA6 and invalid data Invalid may be stored in the source memory block SMB. Whether data stored in the source memory block SMB is valid data or invalid data may be checked based on meta data stored in a meta data storage 210.

Referring to FIG. 6, the meta data may include mapping information and valid data information.

The mapping information may be information representing a mapping relationship between logical addresses LBA1 to LBA4 and physical addresses PBA1 to PBA4.

The physical addresses PBA1 to PBA4 may be physical addresses of the source memory block SMB.

A number of each of the logical addresses LBA1 to LBA4 and the physical addresses PBA1 to PBA4 may be four as shown in FIG. 6. However, this is for the purpose of describing an embodiment of the present disclosure, and other embodiments of the present disclosure are not limited thereto.

The valid data information, illustrated as "VALIDITY" in FIG. 6, may be information representing validity of data included in a plurality of memory blocks. That is, the valid data information may be information representing whether the data included in the plurality of memory blocks is valid or invalid.

An example will be described with reference to FIG. 6. Data corresponding to a first logical address LBA1 and a first physical address PBA1 may be valid. Data corresponding to a second logical address LBA2 and a second physical address PBA2 may be invalid. Data corresponding to a third logical address LBA3 and a third physical address PBA3 may be invalid. Data corresponding to a fourth logical address LBA4 and a fourth physical address PBA4 may be valid. However, the present disclosure is not limited thereto.

The memory controller 200 may control a memory device 100 to perform a migration read operation. When the migration read operation is performed, the valid data DATA1 to DATA6 stored in the source memory block SMB may be read by the memory device 100. When the migration read operation is completed, the valid data DATA1 to DATA6 that was read may be provided to the memory controller 200.

When the read valid data DATA1 to DATA6 is provided to the memory controller 200, the memory controller 200 may control the memory device 100 to perform a migration write operation. When the migration write operation is performed, the read valid data DATA1 to DATA6 may be stored in the target memory block TMB by the memory device 100.

In an embodiment, the target memory block TMB may be a free block selected in the garbage collection.

Figure 7:
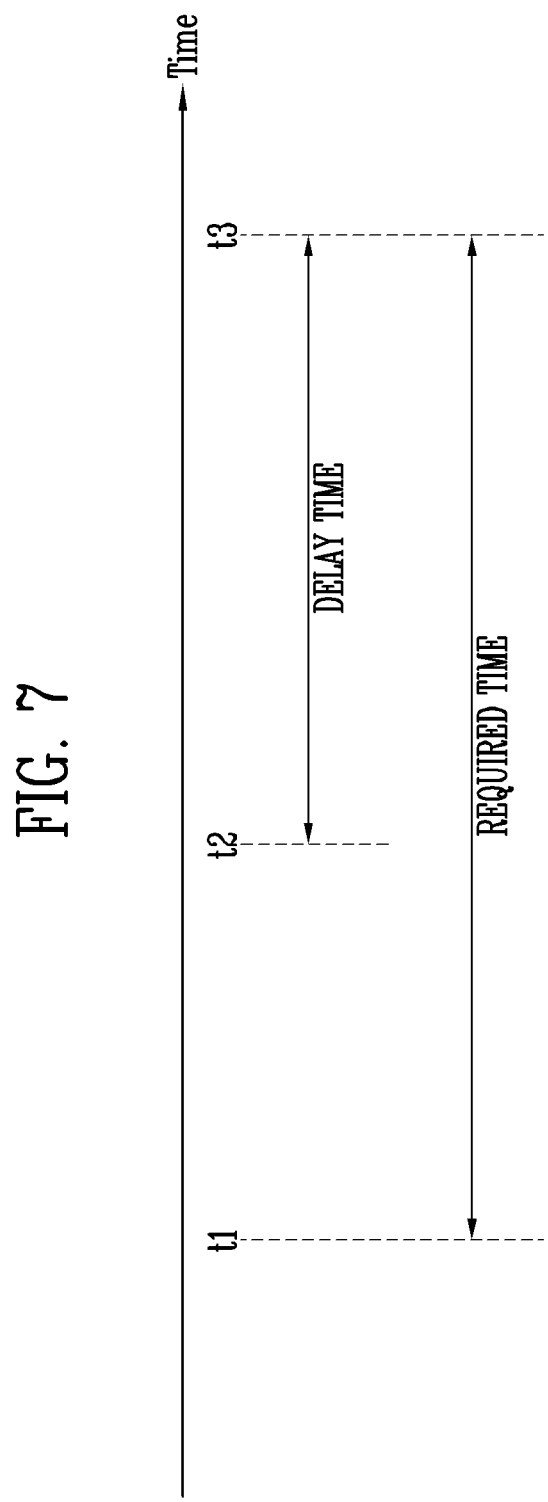
FIG. 7 is a diagram illustrating a required time and a delay time in accordance with an embodiment of the present disclosure.

FIG. 7 is a diagram illustrating a required time and a delay time in accordance with an embodiment of the present disclosure.

Referring to FIGS. 1 and 7, at a first time t1, a previous operation on each of the plurality of dies 111 to 114 may be started. A migration controller 220 may acquire a previous operation start time, which is the time at which the previous operation on each of the plurality of dies 111 to 114 is started. For example, a program operation on the first die 111 may be started at the first time t1. The previous operation start time may be the first time t1.

The previous operation may mean an operation performed on a die before a migration operation is started. For example, the previous operation may be a program operation or an erase operation. The previous operation start time may be a time at which the previous operation is started. Alternatively, the previous operation start time may be a time at which a command for commanding the memory device 100 to perform the previous operation is output to the memory device 100.

At a second time t2, a migration read operation may be started during the migration operation. The migration controller 220 may determine a time at which a migration read command is to be scheduled. For example, the migration controller 220 may determine the second time t2 as a time at which a first migration read command is to be scheduled.

The time at which the migration read command is to be scheduled may mean a time at which the migration read command is to be stored in a migration command queue (not shown).

A required time may be a time period defined from a time t1 at which the previous operation is started to a time t3 at which the previous operation is completed. The required time may be predetermined according to an operation kind of the previous operation, a policy, a product, etc. The operation kind may include a program operation, an erase operation, and the like. For example, the required time may be the period between t1 and t3 as illustrated in FIG. 7.

In an embodiment, a delay time may be predicted based on a previous operation start time, a required time corresponding to the operation kind, and a time at which the migration read command is to be scheduled. For example, when the first time t1 is a previous operation start time of the program operation performed on the first die 111, when the second time t2 is a time at which the first migration read command is to be scheduled, when a time elapsed from the program operation start at the first time t1 to program operation completion at the third time t3 defines a required time, then the delay time may be a period corresponding to a difference between the second time t2 and the third time t3.

Figures 8, 9:
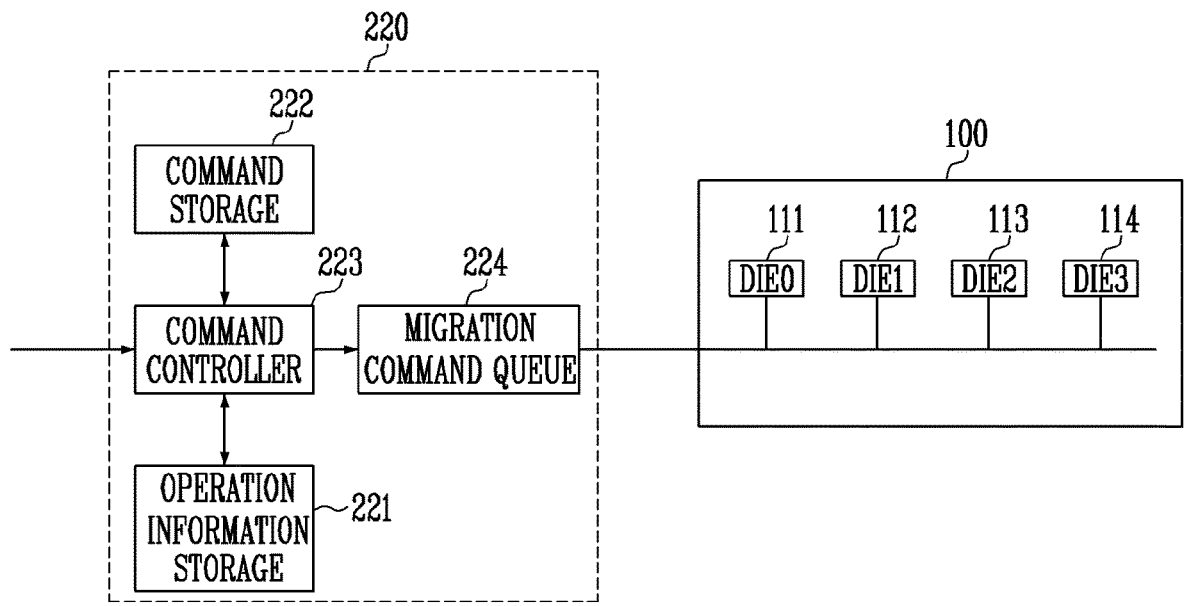
FIG. 8 is a diagram illustrating a migration controller in accordance with an embodiment of the present disclosure.
FIG. 9 is a diagram exemplarily illustrating operation information stored in an operation information storage shown in FIG. 8.

FIG. 8 is a diagram illustrating a migration controller in accordance with an embodiment of the present disclosure. FIG. 9 is a diagram exemplarily illustrating operation information stored in an operation information storage shown in FIG. 8. FIG. 10 is a diagram illustrating a command storage shown in FIG. 8. FIG. 11 is a diagram illustrating a migration command queue shown in FIG. 8.

Referring to FIG. 8, a migration controller 220 may include an operation information storage 221, a command storage 222, a command controller 223, and a migration command queue 224.

The operation information storage 221 may store operation information.

In an embodiment, the operation information may include an operation kind of a previous operation performed on each of the plurality of dies 111 to 114 in a memory device 100 before a migration operation is started, information on whether the previous operation is being performed, and a previous operation start time.

An example will be described with reference to FIGS. 8 and 9. The operation kind of a previous operation performed on each of a first die 111 (DIE0) and a second die 112 (DIE1) may be a program operation. The operation kind of a previous operation performed on each of a third die 113 (DIE2) and a fourth die 114 (DIE3) may be an erase operation. However, the present disclosure is not limited thereto.

An example will be described with reference to FIG. 9. The program operation performed on the first die 111 and the erase operation performed on the third die 113 may be being performed. A previous operation start time of the program operation performed on the first die 111 may be T1, and a previous operation start time of the erase operation performed on the third die 113 may be T2. However, the present disclosure is not limited thereto.

An example will be described with reference to FIG. 9. The program operation performed on the second die 112 and the erase operation performed on the fourth die 114 may be completed. However, the present disclosure is not limited thereto.

The command storage 222 may store a migration read command for commanding the memory device 100 to read valid data stored in a plurality of source memory blocks SMB.

An example will be described with reference to FIGS. 8 to 10. The command storage 222 may store a first migration read command MGR_CMD1 for commanding the memory device 100 to read first valid data, a second migration read command MGR_CMD2 for commanding the memory device 100 to read second valid data, a third migration read command MGR_CMD3 for commanding the memory device 100 to read third valid data, and a fourth migration read command MGR_CMD4 for commanding the memory device 100 to read fourth valid data.

The command controller 223 may select the plurality of source memory blocks SMB, based on meta data. The command controller 223 may check valid data stored in the plurality of source memory blocks SMB, based on the meta data.

When the plurality of source memory blocks SMB are selected, the command controller 223 may generate first to fourth migration read commands MGR_CMD1 to MGR_CMD4, and sequentially store the generated migration read command to the command storage 222.

Referring to FIG. 10, the first migration read command MGR_CMD1 may be a command for commanding the memory device 100 to read first valid data stored in source memory blocks SMB included in the first die 111. The second migration read command MGR_CMD2 may be a command for commanding the memory device 100 to read second valid data stored in source memory blocks SMB included in the second die 112. The third migration read command MGR_CMD3 may be a command for commanding the memory device 100 to read third valid data stored in source memory blocks SMB included in the third die 113. The fourth migration read command MGR_CMD4 may be a command for commanding the memory device 100 to read fourth valid data stored in source memory blocks SMB included in the fourth die 114.

The first to fourth migration read command MGR_CMD1 to MGR_CMD4 may be repeatedly stored in the command storage 222 as shown in FIG. 10.

The command controller 223 may predict a delay time, based on operation information on the previous operation performed on the first die 111 before the migration operation is started and based on the time at which the first migration read command MGR_CMD1 is to be scheduled.

Specifically, the command controller 223 may receive the operation information stored in the operation information storage 221. The command controller 223 may acquire an operation kind of the previous operation performed on the first die 111, information on whether the previous operation is being performed, and a previous operation start time. The command controller 223 may determine a time at which the first migration read command MGR_CMD1 provided from the command storage 222 is to be scheduled. The time at which the first migration read command MGR_CMD1 is to be scheduled may be, for example, a time at which the command controller 223 receives the first migration read command MGR_CMD1 provided from the command storage 222. The command controller 223 may predict a delay time, based on the operation kind of the previous operation, a required time predetermined according to the previous operation start time, and the time at which the first migration read command MGR_CMD1 is to be scheduled.

An example will be described with reference to FIGS. 7 to 9. The command controller 223 may check whether the program operation performed on the first die 111 is being performed, and acquire a previous operation start time T1 of the program operation performed on the first die 111. The command controller 223 may determine a time (e.g., t2 shown in FIG. 7) at which the first migration read command MGR_CMD1 is to be scheduled. The command controller 223 may calculate, as a delay time, a period corresponding to a difference between a required time of the program operation from the previous operation start time T1 and the time at which the first migration read command MGR_CMD1 is to be scheduled.

The command controller 223 may schedule the second migration read command MGR_CMD2 earlier than the first migration read command MGR_CMD1, based on a result obtained by comparing the predicted delay times for the migration read commands with a reference time.

Storing a migration read command in the migration command queue 224 means that the migration read command is scheduled. For example, as shown in FIG. 11, the second migration read command MGR_CMD2 may be stored in the migration command queue 224 first, which means that it is scheduled first in time.

In an embodiment, a command controller 223 may schedule a second migration read command MGR_CMD2 stored in the command storage 222 earlier than the first migration read command MGR_CMD1 according to whether the predicted delay times are greater than or equal to the reference time.

For example, when the delay time predicted for first migration read command MGR_CMD1 is greater than or equal to the reference time, the command controller 223 may store the second migration read command MGR_CMD2 in the migration command queue 224 earlier than the first migration read command MGR_CMD1. When the delay time is smaller than the reference time, however, the command controller 223 may store the first migration read command MGR_CMD1 in the migration command queue 224 earlier than the second migration read command MGR_CMD2.

In an embodiment, a delay time required up until before the first valid data stored in the source memory blocks SMB included in the first die 111 is read is greater than or equal to the reference time, and a result obtained by comparing the reference time with a delay time required up until before the second valid data stored in the source memory blocks SMB is read is also greater than or equal to the reference time. Consequently, the command controller 223 may schedule the third migration read command MGR_CMD3 earlier than the first migration read command MGR_CMD1 and the second migration read command MGR_CMD2.

In another embodiment, the delay time required up until before the second valid data stored in the source memory blocks SMB included in the second die 112 is read may be predicted based on the operation information of the previous operation performed on the second die 112 before the migration operation is started and the time at which the second migration read command MGR_CMD2 is to be scheduled as described with reference to FIG. 9.

For example, when the program operation performed on the second die 112 is completed, the command controller 223 may schedule the second migration read command MGR_CMD2 in the migration command queue 224. The scheduled second migration read command MGR_CMD2 may be output to the memory device 100.

In a further embodiment, a command controller 223 may perform sequential checks based on a command storage 222 before starting migration operations. More specifically, if a program operation is being performed on a die such as DIE0, then the command controller 223 may check operation information (e.g., a required time of a program operation and a previous operation start time) of the previous operation (e.g., a program operation) performed on the next die, such as DIE1, before the migration operation is started. Also, the command controller 223 may determine a time at which the next migration read command, such as MGR_CMD2, is to be scheduled. Also, the command controller 223 may predict a delay time required until before the valid data stored in the source memory blocks SMB included in the next die from among the plurality of source memory blocks SMB is read, based on the operation information and the time at which the next migration read command is to be scheduled. The above process may be repeated for the migration commands in the command storage 222.

In an example, when the delay time required until before the first, second and third valid data is read is greater than or equal to a reference time, the command controller 223 may schedule a fourth migration read command MGR_CMD4 earlier than the first to third migration read commands MGR_CMD1 to MGR_CMD3, based on a result obtained by comparing the reference time with a delay time, shorter than the reference time, required until before the fourth valid data stored in the source memory blocks SMB included in the fourth die 114 is read. The command controller 223 may provide the fourth migration read command MGR_CMD4 to the memory device 100 first before MGR_CMD1 to MGR_CMD3.

In yet another embodiment, the delay time required until before the third valid data is read may be predicted based on operation information of the previous operation performed on the third die 113 and a time at which the third migration read command MGR_CMD3 is to be scheduled.

An example will be described with reference to FIGS. 7 to 9. The command controller 223 may acquire a previous operation start time T2 of the erase operation being performed on the third die 113. The command controller 223 may calculate, as a delay time, a period corresponding to a difference between a required time of the erase operation from the previous operation start time T2 and the time at which the third migration read command MGR_CMD3 is to be scheduled.

An example will be described with reference to FIG. 11. When the delay time required until before the third valid data is read is greater than or equal to the reference time, the fourth migration read command MGR_CMD4 may be stored in the migration command queue 224. The fourth migration read command MGR_CMD4 may be stored next to the second migration read command MGR_CMD2 which is stored earlier than the fourth migration read command MGR_CMD4. Next, if the delay time predicted for the first migration read command MGR_CMD1 is smaller than the delay time predicted for the third migration read command MGR_CMD3, then the command controller 223 may store the first migration read command MGR_CMD1 earlier than the third migration read command MGR_CMD3 in the migration command queue 224.

Although not shown in the drawings, when a migration read operation is completed, the command controller 223 may acquire valid data from the memory device 100. When the command controller 223 acquires the valid data, the command controller 223 may schedule a migration write command for commanding the memory device 100 to store the valid data in a target memory block TMB.

Referring to FIG. 11, the first to fourth migration read commands MGR_CMD1 to MGR_CMD4 stored in the migration command queue 224 may be output to the memory device 100 in a first-in first-out manner. For example, the first to fourth migration read commands MGR_CMD1 to MGR_CMD4 stored in the migration command queue 224 may be output to the memory device 100 in an order of the second migration read command MGR_CMD2, the fourth migration read command MGR_CMD4, the first migration read command MGR_CMD1, and the third migration read command MGR_CMD3.

Figure 12:
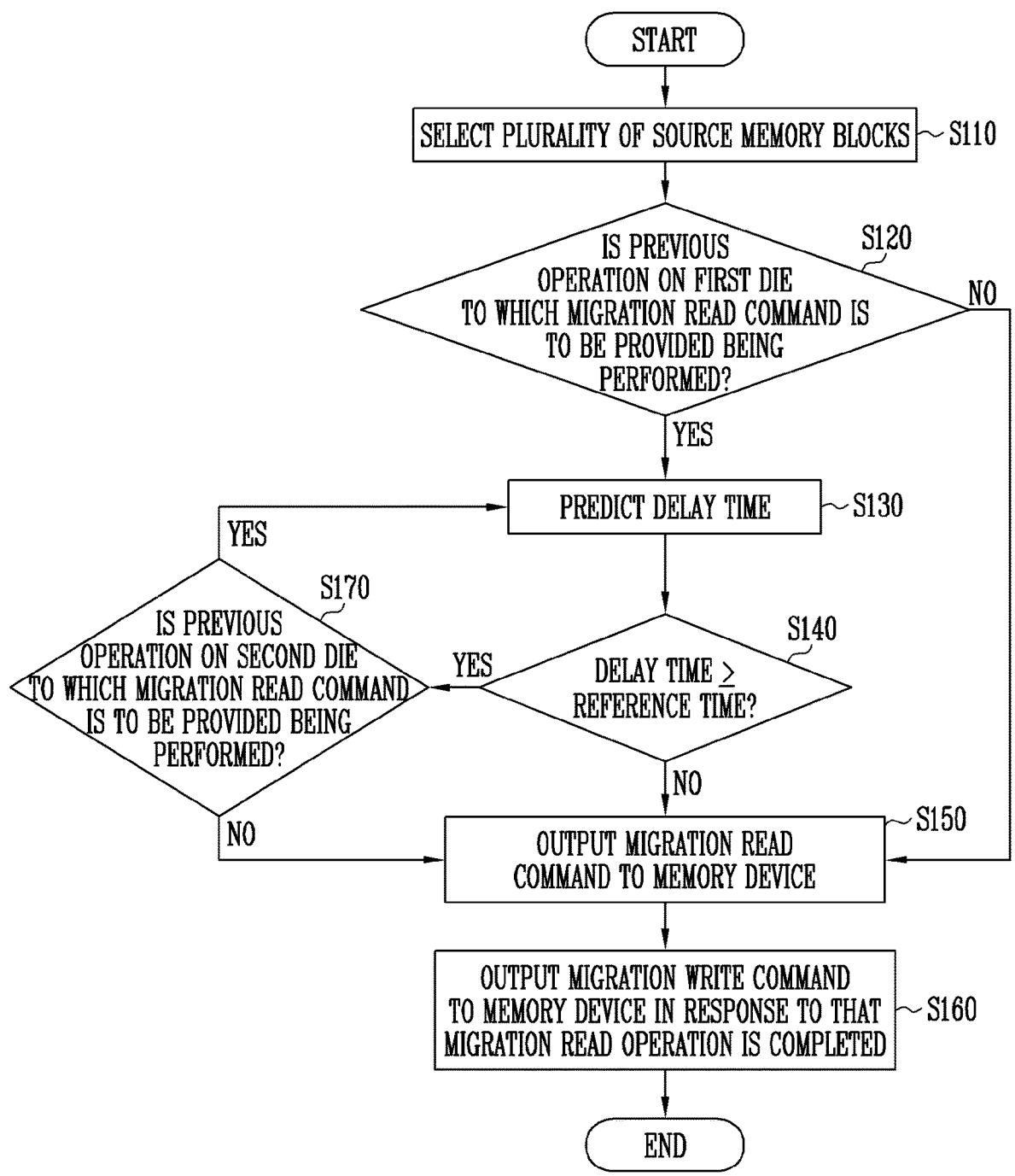
FIG. 12 is a flowchart illustrating an operating method of a memory controller in accordance with an embodiment of the present disclosure.

FIG. 12 is a flowchart illustrating an operating method of a memory controller in accordance with an embodiment of the present disclosure.

Referring to FIG. 12, a memory controller 200 selects a plurality of source memory blocks. For example, the memory controller 200 may select a plurality of source memory blocks from among a plurality of memory blocks included in the memory device 100, based on meta data (S110).

The memory controller 200 checks whether a previous operation on the first die 111 to which a migration read command is to be provided is being performed (S120). For example, as described with reference to FIG. 9, the memory controller 200 may check whether a program operation being performed on the first die 111 is being performed before a migration operation is started.

When the previous operation of the first die 111 is being performed (S120, YES), the memory controller 200 predicts a delay time (S130). Specifically, in response to information that the previous operation on the first die 111 is being performed, the memory controller 200 may calculate a delay time required until before first valid data stored in the source memory blocks included in the first die 111 is read, based on operation information of the previous operation performed on the first die 111 and a time at which a first migration read command is to be scheduled. For example, the memory controller 200 may calculate, as a delay time, a period corresponding to a difference in value between a required time of the program operation from a previous operation start time of the program operation performed on the first die 111 and the time at which the first migration read command is to be scheduled.

The memory controller 200 determines whether the delay time is greater than or equal to a reference time (S140). When the delay time is smaller than the reference time (S140, NO), the memory controller 200 outputs the migration read command to the memory device 100 (S150), and outputs a migration write command to the memory device 100 in response that a migration read operation is completed (S160).

When the delay time is greater than or equal to the reference time (S140, YES), the memory controller 200 checks whether a previous operation on the second die 112 to which a migration read command is to be provided is being performed (S170). When the previous operation on the second die 112 is being performed (S170, YES), the step S130 is performed for the migration read command for the second die 112.

When the previous operation on the first die 111 is completed (S120, NO), the step S150 is performed.

When the previous operation on the second die 112 is completed (S170, NO), the step S150 is performed for the migration read command for the second die 112.

Figure 13:
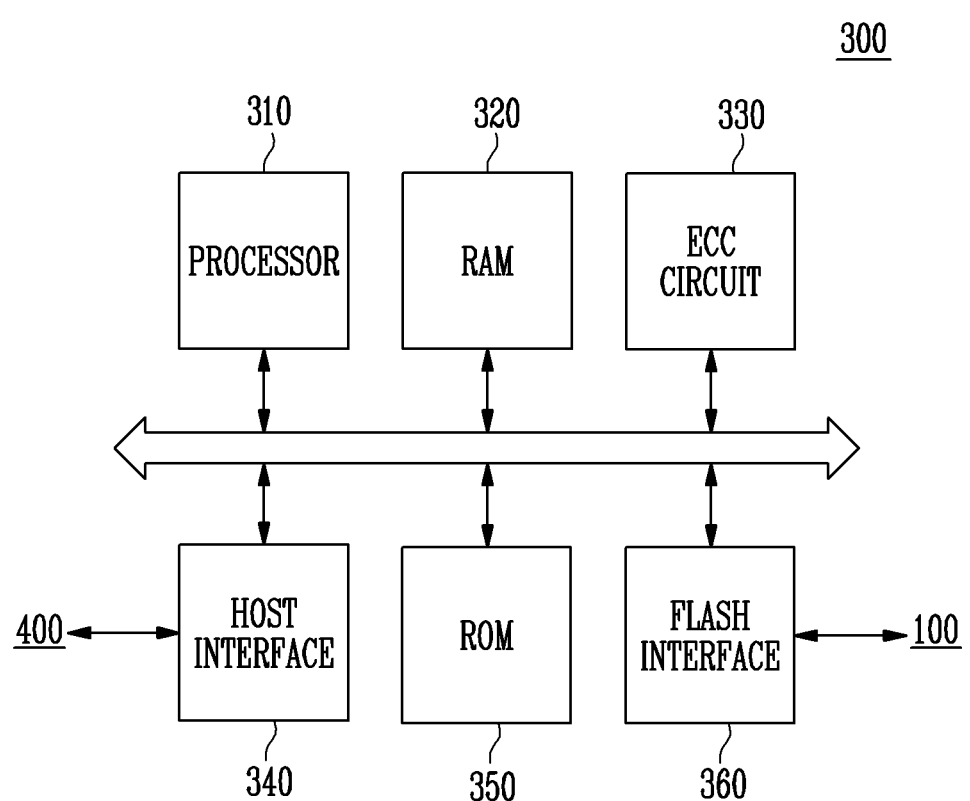
FIG. 13 is a diagram illustrating a memory controller in accordance with an embodiment of the present disclosure.

FIG. 13 is a diagram illustrating a memory controller in accordance with an embodiment of the present disclosure.

Referring to FIG. 13, a memory controller 300 may include a processor 310, a RAM 320, an error correction code (ECC) circuit 330, a host interface 340, a ROM 350, and a flash interface 360. The memory controller 300 may be implemented identically to the memory controller 200 described with reference to FIG. 1.

The processor 310 may control overall operations of the memory controller 300.

The RAM 320 may be used as a buffer memory, a cache memory, a working memory, etc. of the memory controller 300. For example, the RAM 320 may be a buffer memory.

The ECC circuit 330 may generate an ECC for correcting a fail bit or error bit of data received from the memory device 100.

The ECC circuit 330 may generate data to which a parity bit is added by performing ECC encoding of data provided to the memory device 100. The parity bit (not shown) may be stored in the memory device 100.

The ECC circuit 330 may perform ECC decoding on data output from the memory device 100. The ECC circuit 330 may correct an error by using a parity.

For example, the ECC circuit 330 may correct an error by using various coded modulations such as a low-density parity-check (LDPC) code, a Bose-Chaudhuri-Hocquenghem (BCH) code, a turbo code, a Reed-Solomon code, a convolution code, a recursive systematic code (RSC), a trellis-coded modulation (TCM), and a block coded modulation (BCM).

The ECC circuit 330 may calculate an ECC value of data to be programmed to the memory device 100 in a program operation.

The ECC circuit 330 may perform an error correction operation on data read from the memory device 100 in a read operation, based on the ECC value.

The ECC circuit 330 may perform an error correction operation of data recovered from the memory device 100 in a recovery operation of data that fails.

The memory controller 300 may communicate with an external device (e.g., the host 400, an application processor, or the like) through the host interface 340.

The ROM 350 may store, in the form of firmware, various information required in an operation of the memory controller 200.

The memory controller 300 may communicate with the memory device 100 through the flash interface 360. The memory controller 300 may transmit a command CMD, an address ADDR, a control signal CTRL, and the like to the memory device 100 through the flash interface 360, and may receive data DATA.

The flash interface 360 may include, for example, a NAND interface.

Figure 14:
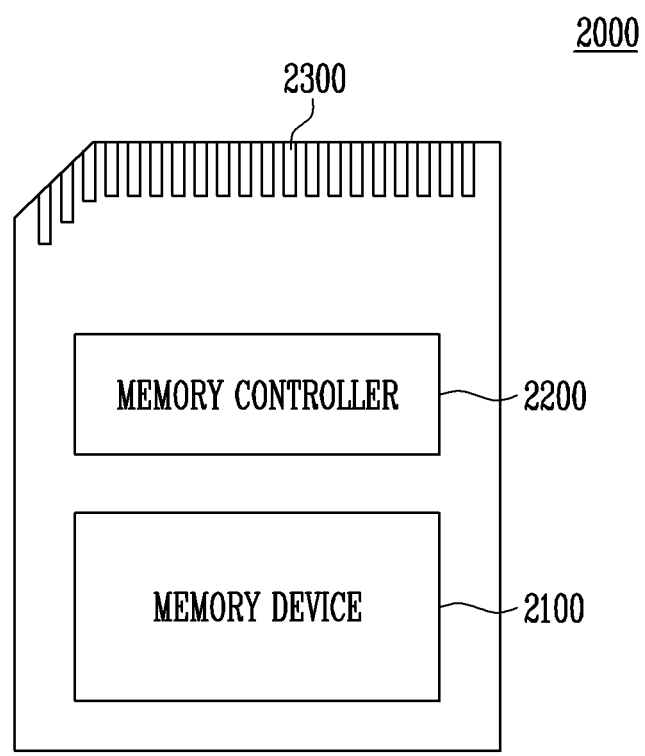
FIG. 14 is a block diagram illustrating a memory card system to which a storage device is applied in accordance with an embodiment of the present disclosure.

FIG. 14 is a block diagram illustrating a memory card system to which a storage device is applied in accordance with an embodiment of the present disclosure.

Referring to FIG. 14, a memory card system 2000 includes a memory device 2100, a memory controller 2200, and a connector 2300.

Exemplarily, the memory device 2100 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 2200 is connected to the memory device 2100. The memory controller 2200 may access the memory device 2100. For example, the memory controller 2200 may control read, write, erase, and background operations of the memory device 2100. The memory controller 2200 provides an interface between the memory device 2100 and a host Host. The memory controller 2200 drives firmware for controlling the memory device 2100. The memory controller 2200 may be implemented identically to the memory controller 200 described with reference to FIG. 1.

Exemplarily, the memory controller 2200 may include components such as a Random Access Memory (RAM), a processing unit, a host interface, a memory interface, and an error corrector.

The memory controller 2200 may communicate with an external device through the connector 2300. The memory controller 2200 may communicate with the external device (e.g., the host 400) according to a specific communication protocol. For example, the memory controller 2200 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), FireWire, a Universal Flash Storage (UFS), Wi-Fi, Bluetooth, and NVMe. For example, the connector 2300 may be defined by at least one of the above-described various communication protocols.

The memory device 2100 and the memory controller 2200 may be integrated into a single semiconductor device, to constitute a memory card. For example, the memory controller 2200 and the memory device 2100 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
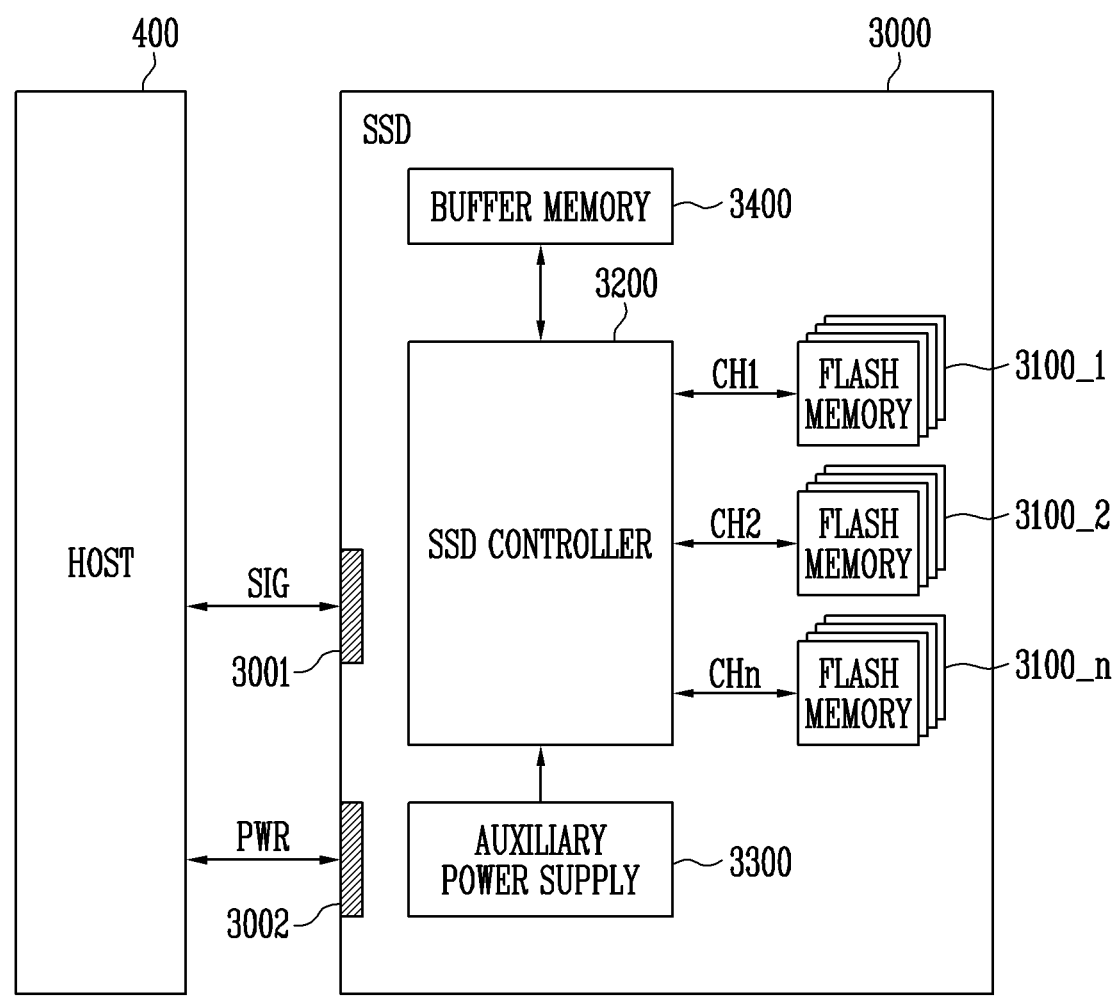
FIG. 15 is a block diagram exemplarily illustrating a Solid State Drive (SSD) system to which a storage device is applied in accordance with an embodiment of the present disclosure.

FIG. 15 is a block diagram exemplarily illustrating an Solid State Drive (SSD) system to which a storage device is applied in accordance with an embodiment of the present disclosure.

Referring to FIG. 15, an SSD system includes a host 400 and an SSD 3000.

The SSD 3000 exchanges a signal SIG with the host 400 through a signal connector 3001, and receives power PWR through a power connector 3002. The SSD 3000 includes an SSD controller 3200, a plurality of flash memories 3100_1, 3100_2, and 3100_n, an auxiliary power supply 3300, and a buffer memory 3400.

In accordance with an embodiment of the present disclosure, the SSD controller 3200 may serve as the memory controller 200 described with reference to FIG. 1.

The SSD controller 3200 may control the plurality of flash memories 3100_1, 3100_2, to 3100_n through channel CH1, CH2, to CHn in response to a signal SIG received from the host 400. For example, the signal SIG may be a signal based on an interface between the host 400 and the SSD 3000. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a FireWire, a Universal Flash Storage (UFS), a WI-FI, a Bluetooth, and an NVMe.

The auxiliary power supply 3300 is connected to the host 400 through the power connector 3002. The auxiliary power supply 3300 may receive the power PWR input from the host 400, and charge the power PWR. When the supply of power from the host 400 is not smooth, the auxiliary power supply 3300 may provide the power of the SSD 3000. For example, the auxiliary power supply 3300 may be located in the SSD 3000, or be located at the outside of the SSD 3000. For example, the auxiliary power supply 3300 may be located on a main board, and provide auxiliary power to the SSD 3000.

The buffer memory 3400 may temporarily store data. For example, the buffer memory 3400 may temporarily store data received from the host 400 or data received from the plurality of flash memories 3100_1, 3100_2, to 3100_n, or temporarily store meta data (e.g., a mapping table) of the flash memories 3100_1, 3100_2, to 3100_n. The buffer memory 3400 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
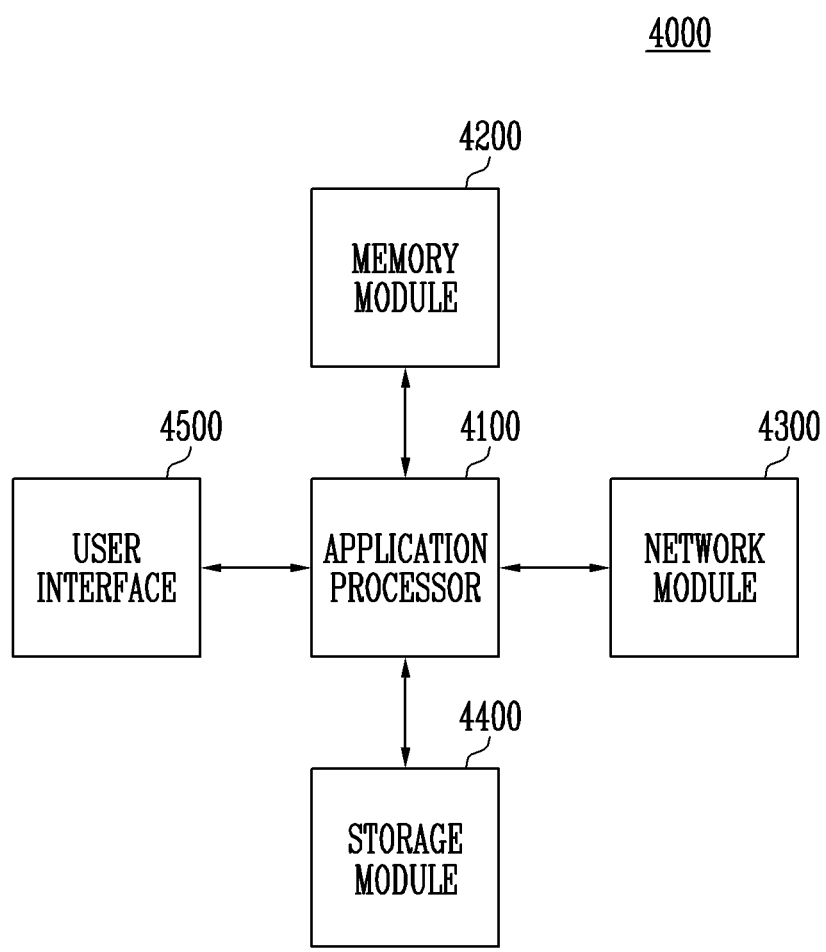
FIG. 16 is a block diagram illustrating a user system to which a storage device is applied in accordance with an embodiment of the present disclosure.

FIG. 16 is a block diagram illustrating a user system to which a storage device is applied in accordance with an embodiment of the present disclosure.

Referring to FIG. 16, a user system 4000 includes an application processor 4100, a memory module 4200, a network module 4300, a storage module 4400, and a user interface 4500.

The application processor 4100 may drive components included in the user system 4000, an operating system (OS), a user program, or the like. For example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. For example, the application processor 4100 and the memory module 4200 may be provided as one semiconductor package by being packaged based on a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. For example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. For example, the storage module 4400 may be provided as a removable drive such as a memory card of the user system 4000 or an external drive.

For example, the storage module 4400 may operate identically to the storage device 1000 described with reference to FIG. 1. The storage module 4400 may include a plurality of nonvolatile memory devices, and the plurality of nonvolatile memory devices may operate identically to the memory device 100 described with reference to FIG. 1.

The user interface 4500 may include interfaces for inputting data or commands to the application processor 4100 or outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a memory controller for improving performance by increasing a speed at which valid data is read in a background operation, and an operating method of the memory controller.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a memory device including a first die and a second die, each die having a plurality of source memory blocks, the memory controller comprising:
    a meta data storage configured to store meta data including mapping information of data stored in the plurality of source memory blocks of the first die and the second die and valid data information indicating whether the stored data is valid data; and
    a migration controller configured to control the memory device to perform a migration operation of moving valid data of the first die and the second die, from a plurality of source memory blocks, to a plurality of target memory blocks in the memory device, based on the meta data,
    wherein the migration operation of moving the valid data includes reading the valid data from the first die and the second die, and
    wherein the migration controller controls the memory device to read a second valid data stored in the second die before reading a first valid data stored in the first die, based on a comparison result between a reference time and a delay time spanning between the time of scheduling a read command for the first valid data and the time of reading the first valid data in the migration operation.

2. The memory controller of claim 1, wherein the migration controller estimates the delay time, based on an operation information of a previous operation performed on the first die before the reading the first valid data begins and a time at which the read command for the first valid data is scheduled.

3. The memory controller of claim 2, wherein the operation information includes an operation kind of the previous operation, an information as to whether the previous operation is being performed, and a previous operation start time, and
    wherein the migration controller estimates the delay time, based on the previous operation start time, a required time predetermined according to the operation kind of the previous operation, and the time at which the read command for the first valid data is scheduled.

4. The memory controller of claim 3, wherein the operation kind is a program operation of storing write data provided from a host in the memory device or an erase operation of erasing write data stored in the memory device.

5. The memory controller of claim 1, wherein the migration controller includes:
    an operation information storage configured to store operation information including an operation kind of a previous operation performed on the first die before the migration operation is started, an information as to whether the previous operation is being performed, and a previous operation start time;
    a command storage configured to store the read command for the first valid data as a first migration read command for commanding the memory device to read the first valid data and a second migration read command for commanding the memory device to read the second valid data; and a command controller configured to check whether the previous operation is being performed and, based on the operation information, to estimate the delay time for the first migration read command, based on the operation kind, the previous operation start time, and a time at which the first migration read command stored in the command storage is scheduled, and wherein when the previous operation is being performed on the first die, the command controller schedules the second migration read command stored in the command storage earlier than the first migration read command when the delay time for the first migration read command is greater than or equal to the reference time.

6. The memory controller of claim 5, wherein the command controller estimates, as the delay time, a period corresponding to a difference between a required time corresponding to the operation kind from the previous operation start time and a time at which the first migration read command is to be scheduled.

7. The memory controller of claim 5, wherein, when the previous operation on the first die is completed, the command controller schedules the first migration read command earlier than the second migration read command.

8. The memory controller of claim 5, wherein the command controller schedules a migration write command to command the memory device to store the second valid data in the target memory block after the second valid data is acquired.

9. The memory controller of claim 1, wherein the migration controller controls the memory device to perform the migration operation within a period from a time after a response to a request from a host is provided back to the host to a time when a subsequent request from the host is received by the memory device.

10. The memory controller of claim 1, wherein the migration controller:
selects the plurality of source memory blocks, based on the meta data; and
checks the valid data stored in the plurality of source memory blocks, based on the valid data information.

11. The memory controller of claim 1, wherein the plurality of source memory blocks are victim blocks selected in garbage collection from among a plurality of memory blocks included in the memory device, and
wherein the target memory block is a free block from among the plurality of memory blocks.

12. A method for operating a memory controller for controlling a memory device including a first die and a second die, each of the first die and the second die having a plurality of source memory blocks, the method comprising:
selecting a plurality of source memory blocks from among a plurality of memory blocks included in the memory device based on meta data including mapping information of data stored in the memory device and valid data information indicating whether the data stored in the memory device is valid data;
estimating a delay time until a first valid data stored in the first die is read;
outputting, to the memory device, a second migration read command for commanding the memory device to read a second valid data stored in the second die before outputting a first migration read command for commanding the memory device to read the first valid data, based on a comparison result between the delay time and a reference time; and
outputting, to the memory device, a migration write command for commanding the memory device to store the second valid data in a target memory block in response to that a migration read operation corresponding to the second migration read command is completed.

13. The method of claim 12, wherein estimating the delay time includes:
acquiring operation information of a previous operation performed on the first die before a migration operation of moving valid data stored in the plurality of source memory blocks to the target memory block is started;
checking whether the previous operation is being performed, based on the operation information; and
calculating the delay time, based on the operation information and a time at which the first migration read command is scheduled in response to that the previous operation is being performed.

14. The method of claim 13, wherein the operation information includes an operation kind of the previous operation, an information as to whether the previous operation is being performed, and a previous operation start time, and
wherein the calculating of the delay time includes calculating, as the delay time, a period between the time at which the first migration read command is scheduled and a required time corresponding to the operation kind from the previous operation start time.

15. The method of claim 14, wherein the operation kind is a program operation of storing write data provided from a host in the memory device or an erase operation of erasing write data stored in the memory device.

16. The method of claim 13, wherein the migration operation is performed within a period from a time after a response to a request from a host is provided back to the host to a time when a subsequent request from the host is received by the memory device.

17. The method of claim 12, wherein the outputting of the second migration read command to the memory device before outputting the first migration read command includes:
scheduling the second migration read command earlier than the first migration read command according to whether the delay time is greater than the reference time; and
outputting the scheduled second migration read command to the memory device.

18. The method of claim 12, wherein the plurality of source memory blocks are victim blocks selected in garbage collection from among a plurality of memory blocks included in the memory device, and
wherein the target memory block is a free block from among the plurality of memory blocks.

19. A method for operating a storage device to schedule data migration operations for a plurality of dies in a memory device, the method comprising:
providing, for the storage device, a memory controller having a command controller, a command storage, an operation information storage, and a migration command queue;
providing, for the storage device, a memory device having a plurality of dies, each of the plurality of dies including a data stored in a plurality of source memory blocks;
storing a plurality of migration commands corresponding to selected source memory blocks from among the plurality of dies in the command storage;
storing, for each of the plurality of dies, an operation information including an operation kind of a previous operation performed on the die before the migration command is scheduled, an information as to whether the previous operation is being performed, and a start time of the previous operation, in the operation information storage;

estimating, for each of the plurality of migration commands in the command storage, a delay time from a time at which each of the plurality of migration commands is scheduled to a time at which a read operation for the respective migration command begins; and writing each of the plurality of migration commands into the migration command queue in order from the largest delay time to the smallest delay time, wherein estimating the delay time includes calculating a required time for the previous operation based on the start time of the previous operation and the operation kind of the previous operation, and includes calculating the difference between the required time and a time at which the migration operation command is scheduled to result in the delay time, and wherein the read operation for a respective migration command is assumed to start when the previous operation is completed.

20. The method of claim 19, further comprising writing a migration command into the migration command queue when the previous operation is not being performed before writing the remainder of the plurality of migration commands into the migration command queue in order from the largest delay time to the smallest delay time.

* * * * *